United States Patent
Keohane et al.

(10) Patent No.: US 8,271,056 B2
(45) Date of Patent: Sep. 18, 2012

(54) MANAGING BATTERY NEEDS IN A PORTABLE DEVICE

(75) Inventors: Susann M. Keohane, Austin, TX (US); Gerald F. McBrearty, Austin, TX (US); Shawn P. Mullen, Buda, TX (US); Jessica C. Murillo, Round Rock, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1281 days.

(21) Appl. No.: 12/015,555

(22) Filed: Jan. 17, 2008

(65) Prior Publication Data
US 2009/0187780 A1 Jul. 23, 2009

(51) Int. Cl.
*H04M 1/00* (2006.01)
(52) U.S. Cl. ..... 455/574; 455/572; 455/573; 455/550.1; 455/418; 379/102.04
(58) Field of Classification Search .......... 455/572–574, 455/418–419, 425, 556.1; 379/102.04; 370/311
See application file for complete search history.

(56) References Cited

U.S. PATENT DOCUMENTS

| | | | |
|---|---|---|---|
| 2006/0135217 A1* | 6/2006 | Sung et al. | 455/573 |
| 2006/0279256 A1 | 12/2006 | Bletsas | |
| 2006/0290322 A1 | 12/2006 | Carbonaro | |
| 2008/0165714 A1* | 7/2008 | Dettinger et al. | 370/311 |
| 2009/0054100 A1* | 2/2009 | Ishida | 455/556.1 |
| 2009/0093281 A1* | 4/2009 | Demirhan et al. | 455/574 |
| 2009/0098914 A1* | 4/2009 | Martin-Cocher et al. | 455/572 |
| 2009/0111452 A1* | 4/2009 | Ying et al. | 455/419 |

* cited by examiner

*Primary Examiner* — Kathy Wang-Hurst
(74) *Attorney, Agent, or Firm* — Stephen R. Tkacs; Stephen J. Walder, Jr.; Steven L. Bennett

(57) ABSTRACT

A battery conservation component synchronizes with a user's schedule or calendar. The battery conservation component may disable functions or features to ensure that the device has sufficient battery life for selected calendar events. The battery conservation component may warn the user if a battery charge is necessary to make selected calendar events. The battery conservation component may be applied to a wide variety of portable devices with time-sensitive events. For example, the battery conservation component may be applied to a device with vehicle navigation and estimate time-sensitive events based on waypoints in the vehicle's route. The battery conservation component may synchronize with a user's travel itinerary. Alternatively, the battery conservation component may suggest alternative functions or features based on a time-sensitive event, such as suggesting a shorter movie on a flight or road trip.

19 Claims, 4 Drawing Sheets

MANAGING BATTERY NEEDS IN A PORTABLE DEVICE

BACKGROUND

1. Technical Field

The present application relates generally to an improved data processing system and method. More specifically, the present application is directed to a method, apparatus, and computer program product to manage battery needs in a portable device.

2. Description of Related Art

Portable devices are becoming pervasive in today's society. Personal digital assistants (PDAs), laptop computers, smart phones, cell phones, handheld computer devices, portable digital video disc (DVD) players, and portable digital media players are examples of portable, mobile devices that are commonly in use by many people. These devices may be used for business or pleasure; however, many of the devices are multi-purpose. For example, a PDA phone may be used for keeping track of meetings, sending electronic mail messages, playing games, making telephone calls, and listening to music.

It is not uncommon today for a person to cancel his or her landline telephone service and switch to using a cell phone as the primary phone service. When an employee is traveling, a cell phone is usually the primary phone used for conference calls and personal calls. The caveat to cell phone usage is that battery life becomes critical to the reliability of the cell phone for primary use. A user may suddenly have an important call dropped due to poor management of battery life.

Other portable devices suffer from the same limitations due to their reliance on battery power. A traveler may begin watching a movie on a laptop computer and have the battery die before the movie is over. A user may use a Web enabled cell phone to view Web pages and be left with no battery life to make a critical phone call.

Cell phones and other portable devices typically have a battery level gauge. However, the user is left to manage the battery life while using the device. The battery level gauge typically uses a primitive graphical indicator to represent remaining battery life. The user must guess whether one out of four bars in the battery indicator is enough battery life to support a 45-minute conference call, for example. Furthermore, a user of a portable device may not be aware of the battery draining features and functions of a device. A typical user may not be aware of how much power is consumed when viewing Web pages on a cell phone, for instance. Therefore, lack of knowledge by the user and primitive battery level indicators result in poor management of battery life for portable devices.

SUMMARY

In one illustrative embodiment, a method for managing battery needs in a portable device comprises receiving one or more schedule events, identifying remaining life of a battery of a portable device, and determining whether the battery will last through the one or more schedule events based on the remaining life of the battery.

In still another exemplary embodiment, receiving one or more schedule events comprises loading a schedule comprising a plurality of schedule events and selecting the one or more schedule events from the plurality of schedule events based on at least one of a predetermined time period, one or more policies, one or more schedule events being marked as battery draining, one or more schedule events being marked critical, or one or more schedule events being marked as requiring the portable device.

In yet another exemplary embodiment, receiving one or more schedule events comprises deriving the one or more schedule events from at least one of a navigation route or a travel itinerary.

In a further exemplary embodiment, determining whether the battery will last through the one or more schedule events comprises examining historical data to determine an amount of power used during particular events or by particular hardware features.

In another exemplary embodiment, identifying remaining life of a battery of a portable device comprises using historical data to adjust for inconsistencies in battery level detection.

In one exemplary embodiment, the method further comprises estimating an allowed time limit for the function or feature based on the one or more schedule events and the remaining battery life responsive to a user starting a function or feature on the portable device and notifying the user of the allowed time limit. In a further exemplary embodiment, the method further comprises stopping the function or feature after expiration of the allowed time limit.

In another exemplary embodiment, the method further comprises updating the one or more schedule events responsive to occurrence of a given event within the one or more schedule events, identifying remaining life of a battery of the portable device, and determining whether the battery will last through the updated one or more schedule events based on the remaining life of the battery.

In another illustrative embodiment, a portable device comprises one or more hardware features, a battery level detection circuit, and battery conservation logic. The battery conservation logic receives one or more schedule events. The battery level detection circuit identifies remaining life of a battery of the portable device. The battery conservation logic determines whether the battery will last through the one or more schedule events based on the remaining life of the battery.

In another illustrative embodiment, a computer program product comprises a computer useable medium having a computer readable program. The computer readable program, when executed on a computing device, causes the computing device to receive one or more schedule events, identify remaining life of a battery of a portable device, and determine whether the battery will last through the one or more schedule events based on the remaining life of the battery.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
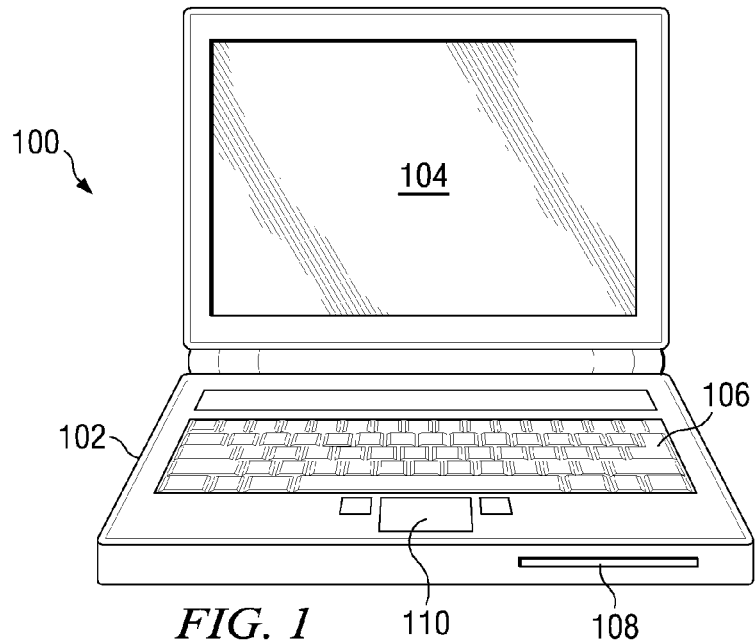
FIG. 1 is a pictorial representation of a data processing system in which the present invention may be implemented in accordance with an illustrative embodiment.
Figure 2:
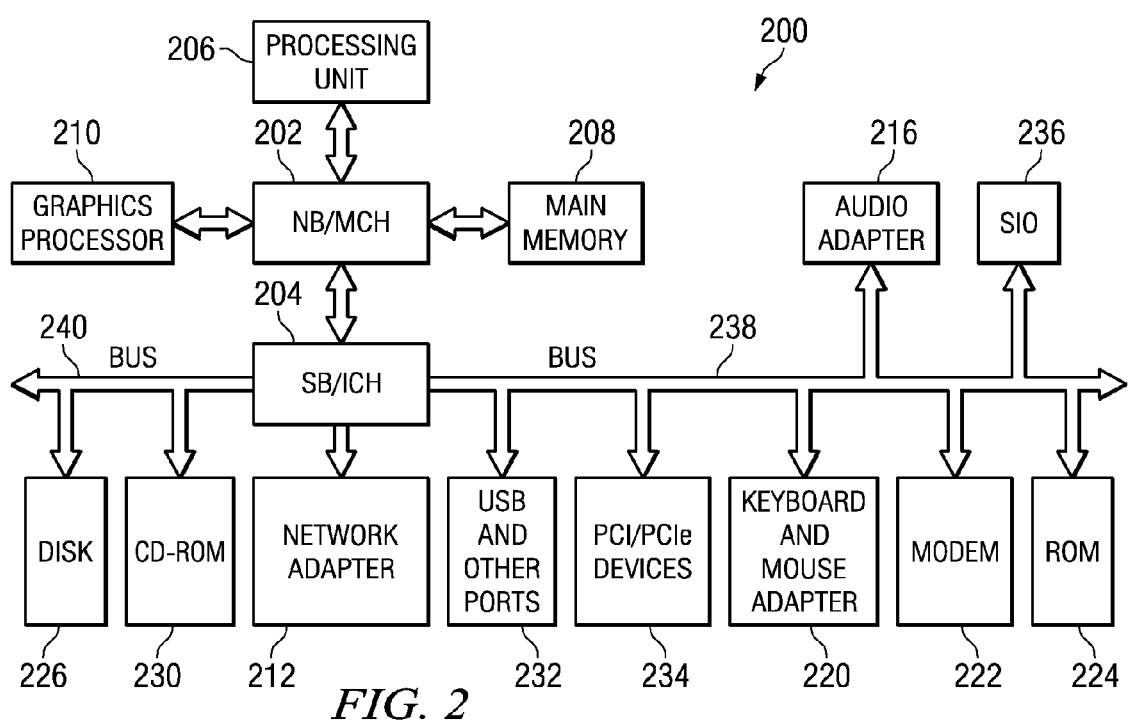
FIG. 2 is a block diagram of an exemplary data processing system in which aspects of the illustrative embodiments may be implemented.
Figure 3:
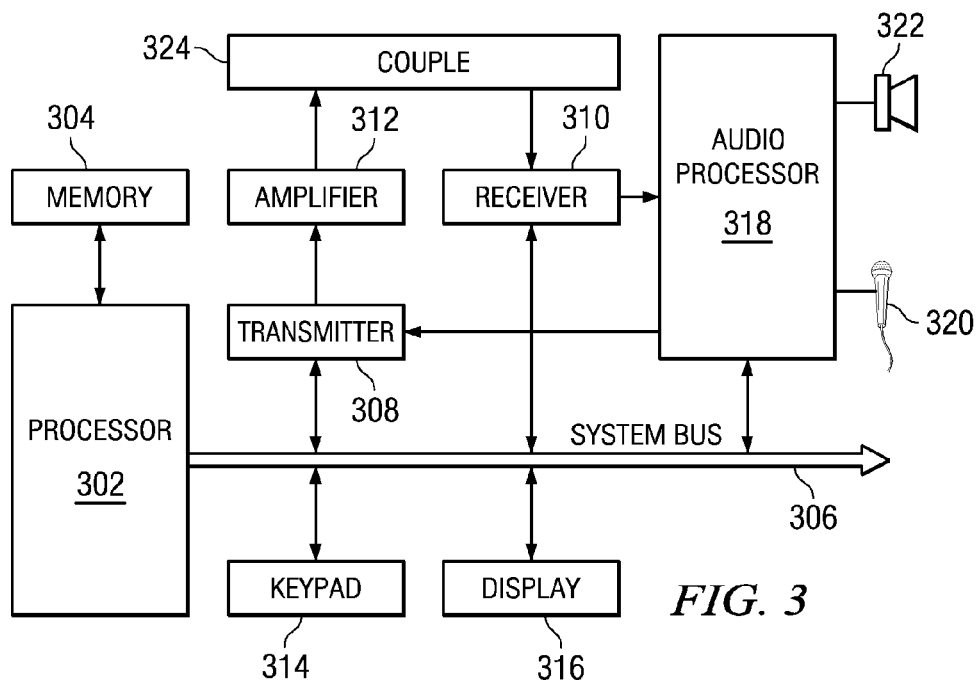
FIG. 3 is a block diagram of a hardware configuration of a telephone device in accordance with an illustrative embodiment.

With reference now to the figures and in particular with reference to FIGS. 1-3, exemplary diagrams of data processing environments are provided in which illustrative embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

With particular reference to FIG. 1, a pictorial representation of a data processing system in which the present invention may be implemented is depicted in accordance with an illustrative embodiment. A mobile computer 100 is depicted which includes system unit 102, video display terminal 104, keyboard 106, storage devices 108, which may include floppy drives and other types of permanent and removable storage media, and pointer device 110. Additional input devices may be included with mobile computer 100, such as, for example, a mouse, joystick, touch screen, trackball, microphone, and the like. Mobile computer 100 may be implemented using any suitable computer, such as an IBM Thinkpad computer, which is a product of International Business Machines Corporation, located in Armonk, N.Y. Computer 100 also preferably includes a graphical user interface (GUI) that may be implemented by means of systems software residing in computer readable media in operation within computer 100.

Mobile computer 100 may run on alternating current (A/C) power or battery power. In fact, a main advantage and purpose of mobile computing devices is location independence. Thus, the ability to operate the computer on battery power is of significant concern to users. However, battery power is a limited resource and some components of computer 100 consume more power than others. For example, graphics processors, hard disk drives, compact disk drives, wireless network interface cards, and the like consume considerable power, which may be a concern when in battery mode. Particularly, components with moving parts, such as hard disk drives, are recognized as relatively high consumers of power.

Users of mobile computing devices may be unaware of the actual power usage by components and, more particularly, software applications. Many users operate a mobile computer, such as a laptop computer, as they would a desktop computer. That is, they may install and utilize many applications that consume resources, and running these applications is completely appropriate when the computer is on A/C power. However, many of these applications may be avoided when in battery mode or using other limited resources. For example, a virus scan application may be invoked by a scheduler to scan the entire hard drive for viruses. Other applications, such as disk defragmentation applications, could be deferred or disabled while on battery power.

In an illustrative embodiment, a battery conservation component may be provided that synchronizes with a user's schedule or calendar. The battery conservation component may disable functions or features to ensure that the device has sufficient battery life for selected calendar events. The battery conservation component may warn the user if a battery charge is necessary to make selected calendar events.

The battery conservation component may be applied to a wide variety of portable devices with time-sensitive events. For example, the battery conservation component may be applied to a device with vehicle navigation and estimate time-sensitive events based on waypoints in the vehicle's route. The battery conservation component may synchronize with a user's travel itinerary. Alternatively, the battery conservation component may suggest alternative functions or features based on a time-sensitive event, such as suggesting a shorter movie on a flight or road trip.

With reference now to FIG. 2, a block diagram of an exemplary data processing system is shown in which aspects of the illustrative embodiments may be implemented. Data processing system 200 is an example of a computer, such as mobile computer 100 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. The operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

The data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

With reference now to FIG. 3, a block diagram of a hardware configuration of a telephone device is depicted in accordance with an illustrative embodiment. The telephone device includes processor 302 for controlling operation of the telephone device and memory 304. Processor 302 may be a general-purpose microprocessor operating under the control of instructions stored in a memory, such as memory 304, or device-specific circuitry for controlling the operation of the telephone device. Processor 302 is connected by system bus 306 to transmitter 308, receiver 310, keypad 314, display 316, and audio processor 318. Keypad 314 may be a physical keypad or a virtual keypad provided via a touch sensitive display and may include function buttons, pointing device controls, or other user interface peripheral elements commonly known in the art. Display 316 may include a liquid crystal display (LCD), plasma display, or other known type of display, such as a cathode ray tube, active matrix display, or the like.

Transmitter 308 and receiver 310 are coupled to a telephone signal by couple 324 to provide full duplex communication. The telephone signal may be provided by a telephone line (not shown) in a land-based telephone or an antenna in a wireless telephone. Audio processor 318 provides basic analog audio outputs to speaker 322 and accepts analog audio inputs from microphone 320. Received signals are demodulated and decoded by receiver 310. Transmitter 308 encodes and modulates signals passed to it by processor 302 or audio processor 318. The output of the transmitter is amplified by power amplifier 312 to control the power level at which the signal is transmitted.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system without departing from the spirit and scope of the present invention.

Figure 4:
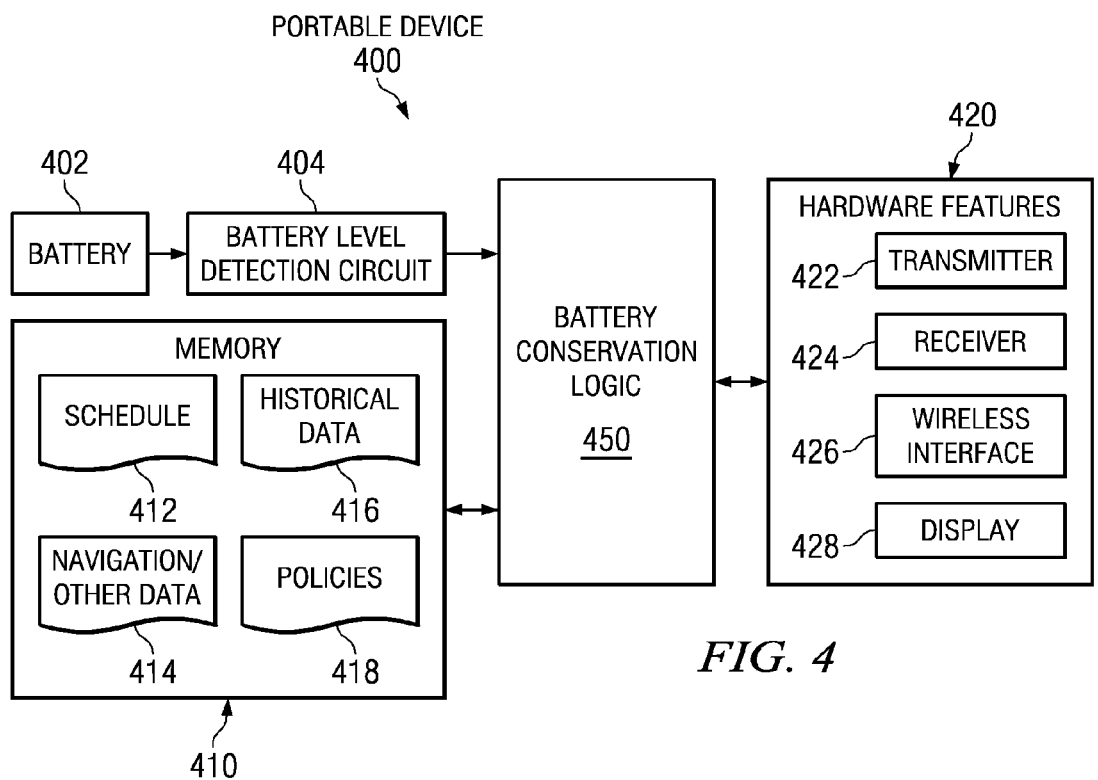
FIG. 4 is a block diagram illustrating components of a portable device in accordance with an illustrative embodiment.

FIG. 4 is a block diagram illustrating components of a portable device in accordance with an illustrative embodiment. Portable device 400 includes battery 402 and hardware features 420. Battery 402 provides power to portable device 400, although in some embodiments portable device 400 may also receive power via an alternating current (AC) power source, such as household AC power. In the depicted example, portable device 400 receives power from battery 402, which has an associated battery level detection circuit 404.

Hardware features 420 include, for example, transmitter 422, receiver 424, wireless interface 426, and display 428. Transmitter 422 and receiver 424 may be cellular technology interfaces for sending or receiving voice or data. Wireless interface 426 may be a Bluetooth™ interface or wireless Ethernet interface, for example. "BLUETOOTH" is a trademark of Bluetooth SIC in the United States, other countries, or both. The wireless Ethernet interface may provide access to the Internet, for instance. Hardware features 420 may include more or fewer hardware features within the spirit and scope of the present invention. For example, in alternative embodiments, hardware features 420 may include one or more hard disk drives, one or more optical disk drives, solid state memory interfaces, graphics accelerators, and the like.

Battery conservation logic 450 receives battery level information from battery level detection circuit 404. Battery conservation logic 450 also receives time-sensitive event information from memory 410. Battery conservation logic 450 may be embodied in hardware, software, or a combination of hardware and software. In one exemplary embodiment, battery conservation logic 450 may be software code that provides battery conservation functionality to portable device 400 when it is executed on a processor, such as processing unit 206 in FIG. 2 or processor 302 in FIG. 3. Battery conservation logic 450 may be computer readable code that is stored in a non-volatile read-only memory, such as ROM 224, or a volatile random access memory, such as main memory 208 in FIG. 2 or memory 304 in FIG. 3. Computer readable code for battery conservation logic 450 may be persisted to a non-volatile memory or a storage device, such as disk 226 in FIG. 2 or a removable storage medium. Computer readable code for battery conservation logic 450 may also be distributed to portable device 400 via a transmission medium.

In the depicted example, memory 410 stores schedule 412, navigation or other data 414, historical data 416, and policies 418. In one illustrative embodiment, battery conservation logic 450 receives schedule 412 from memory 410. Schedule 412 may be stored from a calendar, task management, or scheduler program. For example, schedule 412 may be stored by a calendar program with which the user schedules telephone conferences. In this example, portable device 400 may be a cellular telephone with which the user will conduct the telephone conference. In another example, schedule 412 may be a to-do list stored by a task management application. Historical data 416 may also be used to adjust for inconsistencies in battery level detection circuit 404.

Battery conservation logic 450 may then select particular events from schedule 412. In one exemplary embodiment, battery conservation logic 450 may select one or more events from schedule 412 that fall within a predetermined time period. The predetermined time period may be a set time, such as two hours, for example. Alternatively, the predetermined time period may be a percentage of the maximum battery life or the current expected battery life. Furthermore, events within schedule 412 may be marked as critical. In another example, events within schedule 412 may be marked as using portable device 400. For example, a lunch appointment may not require use of portable device 400, while a telephone conference may require use of portable device 400. Thus, battery conservation logic 450 may select only those events in schedule 412 that are critical or use portable device 400. Furthermore, battery conservation logic 450 may select events in schedule 412 according to policies 418. The user may save preferences or best practices in policies 418 that may be used when selecting events from schedule 412.

In another exemplary embodiment, battery conservation logic 450 may select schedule events from navigation or other data 414. For example, portable device 400 may include vehicle navigation functionality and navigation/other data 414 may include a route for a road trip. Battery conservation logic 450 may derive time-sensitive events based on waypoints in the route. For instance, conservation logic 450 may select each waypoint on the route until a stop at a hotel where portable device 400 may be recharged. In another example, navigation/other data 414 may include a travel itinerary. Battery conservation logic 450 may combine the travel itinerary and schedule 412, for instance.

Battery conservation logic 450 may then determine whether there is sufficient battery life for the selected events. Battery conservation logic 450 may examine historical data 416 to determine the amount of power used during particular events or by particular hardware features 420. If there is insufficient battery life for the selected events, battery conservation logic 450 may disable functions or features of portable device 400 and warn the user. Thus, battery conservation logic 450 may prompt the user to charge battery 402 based on time-sensitive events in schedule 412, for example.

If there is sufficient battery life for the selected events, battery conservation logic 450 may restrict certain functions or features of portable device 400 to ensure that battery 402 lasts through the selected events. For example, if portable device 400 is a cellular telephone and the user initiates a Web browser, battery conservation logic 450 may disable the Web browser feature and notify the user. In another example, portable device 400 may be a laptop computer and the user may begin to watch a DVD movie. Battery conservation logic 450 may determine that the DVD movie is 120 minutes long, and according to the travel itinerary, the flight is scheduled to land in 90 minutes. Battery conservation logic 450 may disable the DVD feature or suggest a shorter movie. Furthermore, battery conservation logic 450 may estimate the amount of battery life that would be used to watch a 120-minute movie, based on historical data 416 perhaps, and restrict access to software or hardware features based on this information and the selected time-sensitive events. For instance, there may not be enough battery life to watch the move and conduct a presentation, which is one of the selected schedule events, using the laptop computer.

Battery conservation logic 450 may limit access to one or more of hardware features 420, or software features of portable device 400, based on the selected time-sensitive events. For instance, battery conservation logic 450 may dim display 428 or disable wireless interface 426. As another example, battery conservation logic 450 may estimate an allowed time limit for a function or feature based on the selected schedule events and remaining battery life. Battery conservation logic 450 may present a message on display 428 that informs the user that a requested function or feature is allowed for a set period of time, for example.

Figure 5A:
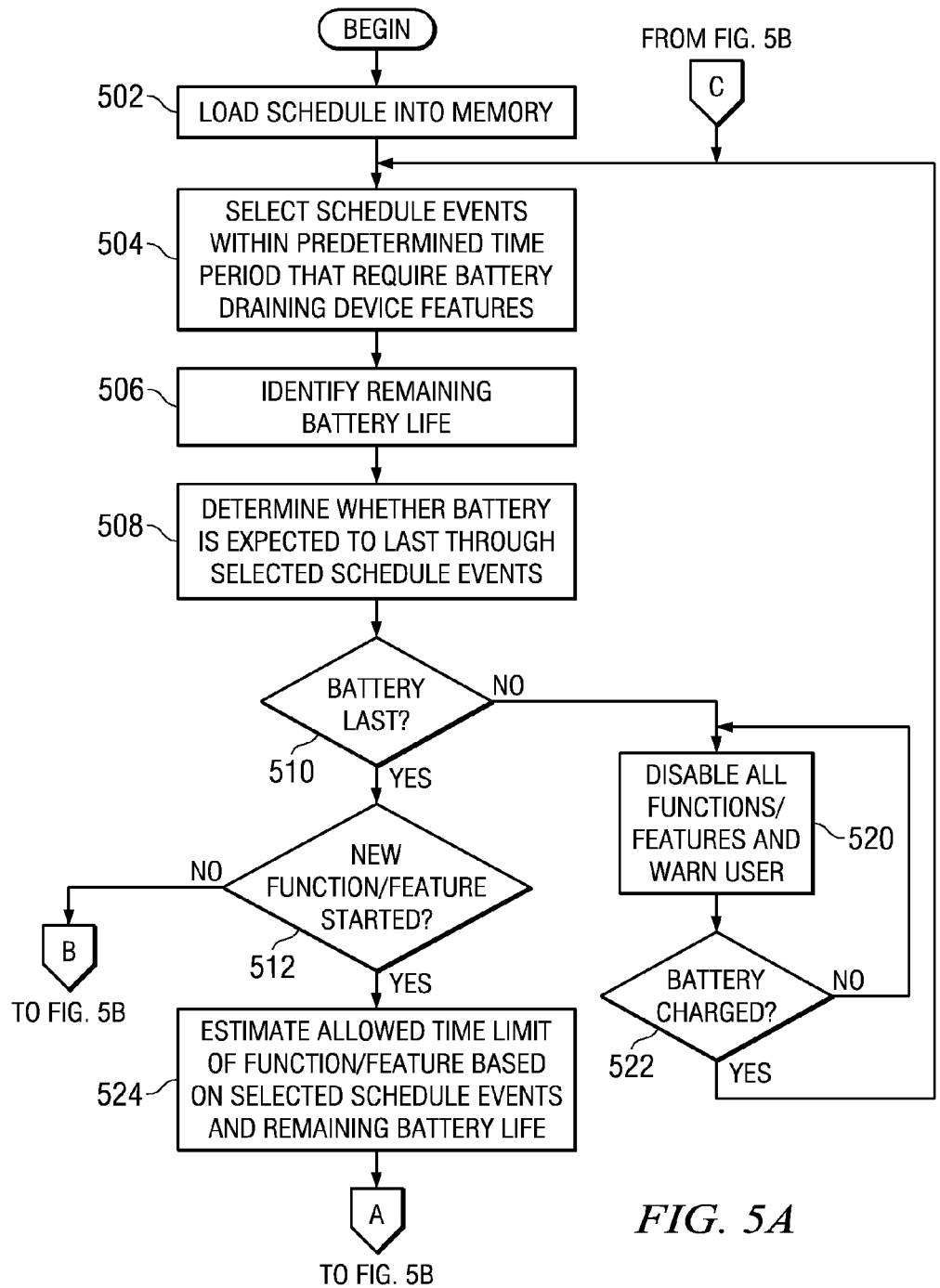
FIGS. 5A and 5B are flowchart illustrating operation of a battery conservation component in a portable device in accordance with an illustrative embodiment.
Figure 5B:
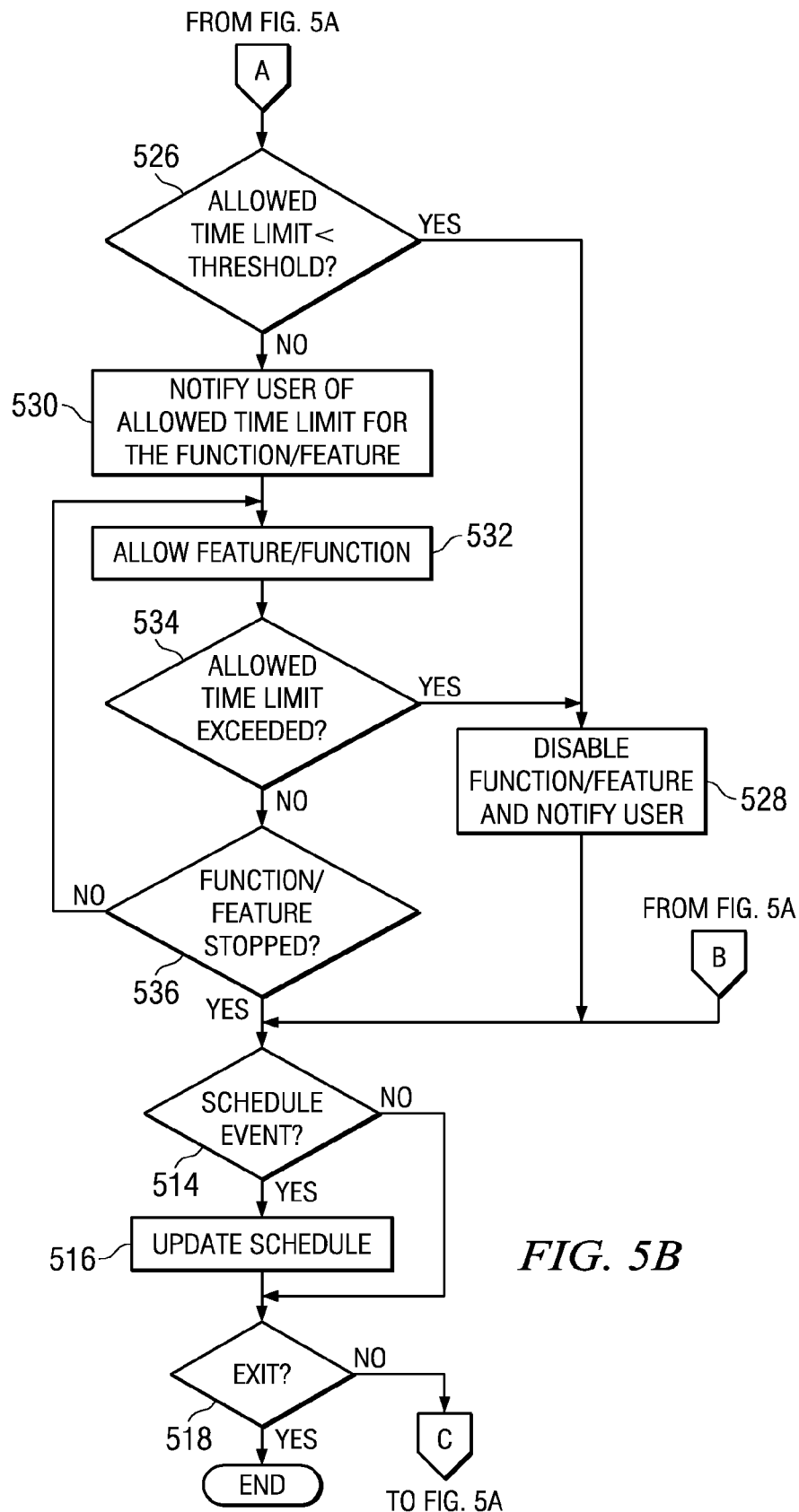

FIGS. 5A and 5B are a flowchart illustrating operation of a battery conservation component in a portable device in accordance with an illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

With reference now to FIGS. 5A and 5B, operation begins and the battery conservation component loads schedule information into memory (block 502). Schedule information may include calendar entries and information derived from other data, such as navigation route data, travel itinerary, and the like. The schedule information includes one or more time-oriented events. Schedule information may also include system scheduled events, such as critical firmware updates and the like.

The battery conservation component then selects schedule events within a predetermined time period that require battery draining device features (block 504). The predetermined time period may be a set time, such as two hours, for example. Alternatively, the predetermined time period may be a percentage of the maximum battery life or the current expected battery life. Furthermore, schedule events may be marked as critical. In another example, schedule events may be marked as requiring the portable device. For example, a lunch appointment may not require use of the portable device, while a telephone conference may require use of the portable device. Thus, the battery conservation logic may select only those events that are critical or use the portable device. Furthermore, battery conservation logic may select schedule events according to policies.

Next, the battery conservation component identifies the remaining battery life (block 506). The battery conservation component determines whether the battery is expected to last through the selected schedule events based on the remaining battery life (block 508). The battery conservation component makes a determination as to whether the battery is expected to last (block 510). If the battery is expected to last, the battery conservation component determines whether a new function or feature is started (block 512).

If a new function or feature is not started, the battery conservation component determines whether a new event is scheduled (block 514). If a new event is scheduled, the battery conservation component updates the schedule (block 516). Thereafter, or if a new event is not scheduled in block 514, the battery conservation component determines whether an exit condition exists (block 518). An exit condition may exist, for example, when the portable device is powered down or running on AC power. If an exit condition exists, operation ends. If, however, an exit condition does not exist in block 518, operation returns to block 504 to select schedule events.

Returning to block 510, if the battery is not expected to last through the selected schedule events, the battery conservation component disables all or a portion of the functions and features of the portable device and warns the user (block 520). To ensure that the battery life of the portable device will last through the selected schedule events, the user should charge the battery. Thus, the battery conservation component determines whether the battery is charged (block 522). If the battery is not charged, operation returns to block 520 to disable functions and features and warn the user. If the battery is charged in block 522, operation returns to block 504 to select schedule events.

With reference to block 512, if a new function or feature is started, the battery conservation component estimates an allowed time limit of the function or feature based on the selected schedule events and the remaining battery life (block 524). Then, the battery conservation component determines whether the allowed time limit is less than a predetermined threshold (block 526). The allowed time limit must be long enough to make the function or feature useful to the user. If the allowed time limit is less than the threshold, the battery conservation component disables the function or feature and notifies the user (block 528). Thereafter, operation proceeds to block 514 to determine whether a new event is scheduled.

If the allowed time limit is not less than the threshold in block 526, the battery conservation component notifies the user of the allowed time limit for the function or feature (block 530). This puts the user on notice that functions and/or features are being limited due to schedule events and remaining battery life. Then, the battery conservation component allows the feature or function (block 532). Next, the battery conservation component determines whether the allowed time limit is exceeded (block 534). If the allowed time limit is exceeded, then operation proceeds to block 528 to disable the function or feature and notify the user. If the allowed time limit is not exceeded in block 534, the battery conservation component determines whether the user stops use of the function or feature. If the user does not stop use of the function or feature, operation returns to block 532 to allow the feature or function. If the user does stop use of the function or feature in block 536, operation proceeds to block 514 to determine whether a new event is scheduled.

Thus, the illustrative embodiments solve the disadvantages of the prior art by providing a battery conservation component that synchronizes with a user's schedule or calendar. The battery conservation component may disable functions or features to ensure that the device has sufficient battery life for selected calendar events. The battery conservation component may warn the user if a battery charge is necessary to make selected calendar events.

The battery conservation component may be applied to a wide variety of portable devices with time-sensitive events. For example, the battery conservation component may be applied to a device with vehicle navigation and estimate time-sensitive events based on waypoints in the vehicle's route. The battery conservation component may synchronize with a user's travel itinerary. Alternatively, the battery conservation component may suggest alternative functions or features based on a time-sensitive event, such as suggesting a shorter movie on a flight or road trip.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing battery needs in a portable device, the method comprising:
    identifying, by the battery level detection circuit, remaining life of a battery portable device;
    determining a time period based on the remaining life of the battery;
    receiving, by a battery level detection circuit in the portable device, one or more schedule events from a calendar program, wherein each of the one or more schedule events is a time oriented event scheduled to occur at a future time within the time period;
    determining, by the battery level detection circuit, whether the battery will last through the one or more schedule events based on the remaining life of the battery; and responsive to determining the battery will last through the one or schedule events, disabling one or more non-essential hardware features of the portable device based on the remaining life of the battery and an amount of power used by the non-essential, essential hardware features derived from historical data.

2. The method of claim further comprising:
responsive to a determination that the battery will last through the one or more schedule events, disabling one or more functions of the portable device based on the remaining life of the battery.

3. The method of claim 1, further comprising:
responsive to a determination that the battery will last through the one or more schedule events, limiting access to one or more functions of the portable device based on the remaining life of the battery.

4. The method of claim 1, wherein receiving one or more schedule events comprises:
selecting the one or more schedule events based on one or more schedule events being marked as requiring the portable device.

5. The method of claim 1, wherein determining whether the battery will last through the one or more schedule events comprises examining historical data to determine an amount of power used during particular events or by particular hardware features.

6. The method of claim 1, wherein identifying remaining life of a battery of a portable device comprises using historical data to adjust for inconsistencies in battery level detection.

7. The method of claim 1, further comprising:
responsive to a user starting a function or feature on the portable device, estimating an allowed time limit for the function or feature based on the one or more schedule events and the remaining battery life; and
notifying the user of the allowed time limit.

8. The method of claim 7, further comprising:
stopping the function or feature after expiration of the allowed time limit.

9. The method of claim 1, further comprising:
responsive to occurrence of a given event within the one or more schedule events, updating the one or more schedule events;
identifying remaining life of a battery of the portable device; and
determining whether the battery will last through the updated one or more schedule events based on the remaining life of the battery.

10. A portable device, comprising:
a plurality of hardware features;
a battery level detection circuit, wherein the battery level detection circuit identifies remaining life of a battery of the portable device; and
battery conservation logic, wherein the battery conservation logic determines a time period based on the remaining life of the battery, receives one or more schedule events from a calendar program, wherein each of the one or more schedule events is a time-oriented event scheduled to occur at a future time within the time period;
wherein the battery conservation logic determines whether the battery will last through the one or more schedule events based on the remaining life of the battery; and
wherein responsive to determining the battery will last through the one or more schedule events, the battery conservation logic disables one or more of the plurality of hardware features based on the remaining life of the battery and an amount of power used by the non-essential hardware features derived from historical data.

11. The portable device of claim 10, wherein responsive to a determination that the battery will last through the one or more schedule events, the battery conservation logic disables one or more functions of the portable device based on the remaining life of the battery.

12. The portable device of claim 10, wherein responsive to a determination that the battery will last through the one or more schedule events, the battery conservation logic limits access to one or more functions of the portable device, based on the remaining life of the battery.

13. The portable device of claim 10, wherein receiving one or more schedule events comprises:
selecting the one or more schedule events based on one or more schedule events being marked as requiring the portable device.

14. The portable device of claim 10, wherein the portable device is one of personal digital assistant, laptop computer, smart phone, cell phone, handheld computer device, portable digital video disc player, or portable digital media player.

15. A computer program product comprising a non-transitory computer storage medium having a computer readable program stored thereon, wherein the computer readable program, when executed on a portable computing device, causes the portable computing device to:
identify remaining life of a battery of the portable computing device;
determine a time period based on the remaining life of the battery;
receive one or more schedule events from a calendar program, wherein each of the one or more schedule events is a time-oriented event scheduled to occur at a future time within the time period;
determine whether the battery will last through the one or more schedule events based on the remaining life of the battery; and
responsive to determining the battery will last through the one or more schedule events disable one or more hardware features of the portable computing device based on the remaining life of the battery and an amount of power used by the non-essential hardware features derived from historical data.

16. The computer program product of claim 15, wherein the instructions further cause the processor to:
responsive to a determination that the battery will last through the one or more schedule events, disable one or more functions of the portable device based on the remaining life of the battery.

17. The computer program product of claim 15, wherein the instructions further cause the processor to:
responsive to a determination that the battery will last through the one or more schedule events, limit access to one or more functions of the portable device based on the remaining life of the battery.

18. The computer program product of claim 15, wherein the computer readable program comprises instructions that are stored in a computer readable storage medium in a data processing system, and wherein the instructions were downloaded over a network from a remote data processing system.

19. The computer program product of claim 15, wherein the computer readable program comprises instructions that are stored in a computer readable storage medium in a server data processing system, and wherein the instructions are downloaded over a network to a remote data processing system for use in a computer readable storage medium with the remote data processing system.

* * * * *